Feb. 6, 1962 C. J. NEENAN 3,020,365

SELF-NORMALLING VIDEO JACK

Filed April 23, 1959 2 Sheets-Sheet 1

INVENTOR.
CHARLES J. NEENAN
BY
Brumbaugh, Free, Graves & Donohue
ATTORNEYS

Feb. 6, 1962 C. J. NEENAN 3,020,365

SELF-NORMALLING VIDEO JACK

Filed April 23, 1959 2 Sheets-Sheet 2

INVENTOR.
CHARLES J. NEENAN

BY

Brumbaugh, Free, Graves & Donohue

ATTORNEYS

United States Patent Office 3,020,365

Patented Feb. 6, 1962

3,020,365
SELF-NORMALLING VIDEO JACK

Charles J. Neenan, Westport, Conn., assignor to Columbia Broadcasting System, Inc., New York, N.Y., a corporation of New York Filed Apr. 23, 1959, Ser. No. 808,526
3 Claims. (Cl. 200—51.09)

This invention relates to a jack for use in making electrical connections, and more particularly, to a self-normalling jack for use in television systems, and the like, although it is not limited to such use.

For many years, jackfields have been widely used for interconnecting audio circuits in broadcasting, telephone and sound distribution systems. Usually, the jackfield has comprised rows of panel-mounted jacks having contacts to which the inputs and outputs of the several components comprising the system are connected. The system components and circuits are connected together, or "normalled" through built-in normalling springs and contacts in the jacks by short jumper connections at the rear of the jackfield.

However, audio-type jackfields cannot be used in high quality television broadcasting systems and closed circuit program distribution systems because at video frequencies the audio jacks introduce impedance discontinuities, insertion losses and cross talk to such an extent that the video transmission is impaired. For this reason, only simple receptacle-type jack units, which provide suitable contacts only for the inner and outer conductors of the coaxial circuit connectors, have been used heretofore in video jackfields. Since the jacks are not self-normalling, the components must be coupled together or "normalled" by U-shaped plugs and cables at the jackfield to build up a complete system suitable for broadcasting.

Considerable inconvenience and difficulty have been experienced with jackfields of this type because all of the connections between the jacks must be made at the front of the panel. Under normal operating conditions, the various plugs and the cords between them prevent easy access to the jacks and make it very difficult to read the jack designation cards that are usually mounted above or below the jacks. Moreover, since any normally or terminating plug must be removed from a jack before a patch plug can be inserted into it, the use of the patch plug results in an interruption in service. Furthermore, the limited range of the normalling plugs necessitates that the jacks leading to the adjacent components in the system be positioned adjacent each other in the panel, which usually is not the most convenient place.

It is an object of this invention, accordingly, to provide a self-normalling jack for use in a video jackfield, and the like, which is free from the above-noted deficiencies of the prior art.

Another object of the invention is to provide a new and improved self-normalling jack of the above character which introduces minimum impedance discontinuity, insertion loss and crosstalk in the system yet is reasonable in cost, rugged, long-lived and compact.

A self-normalling jack according to the invention comprises a frame carrying a plurality of spaced apart fixed contacts adapted to be engaged selectively by a movable contact. One of these contacts is electrically connected to the center pin of the jack plug receptacle and access means is provided enabling electrical connection to the other contact. The movable contact is carried by a movable contact arm which is positioned remotely with respect to the arms supporting the fixed contacts. Also, the movable contact normally engages one of the fixed contacts but is is adapted to be moved into engagement with the other fixed contact by actuator means responsive to insertion of a jack plug in the jack. A fixed conductor is mounted parallel to the movable contact arm but insulated therefrom and is connected to the arm supporting the fixed contact normally engaged by the movable contact. The jack elements are suitably positioned and shaped so that the impedance of the jack approximates the impedance of a piece of coaxial cable. Hence it introduces minimum impedance discontinuity, insertion loss and cross-talk in any system in which it is used.

The invention may be better understood from the following detailed description of a representative embodiment of the invention taken in conjunction with the accompanying drawings, in which.

Figure 2:
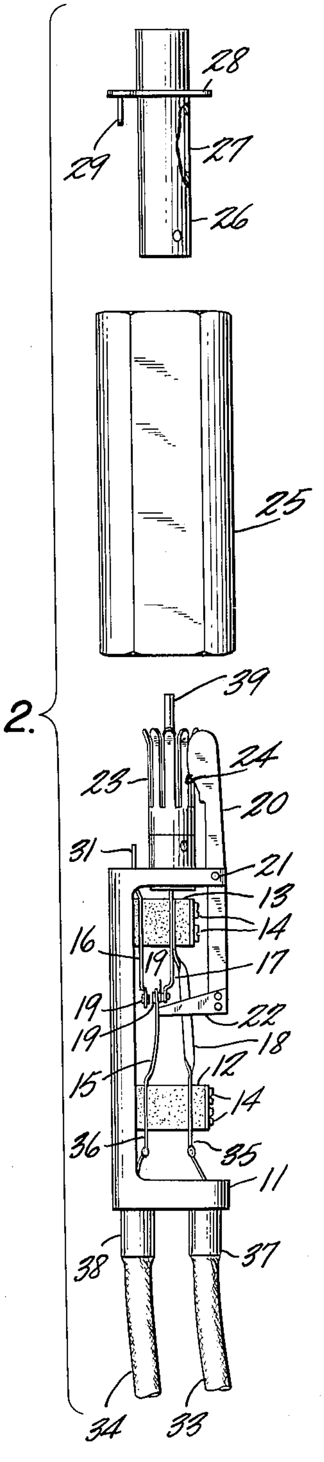
FIG. 2 is an exploded view of the video jack illustrated in FIG. 1.
Figure 1:
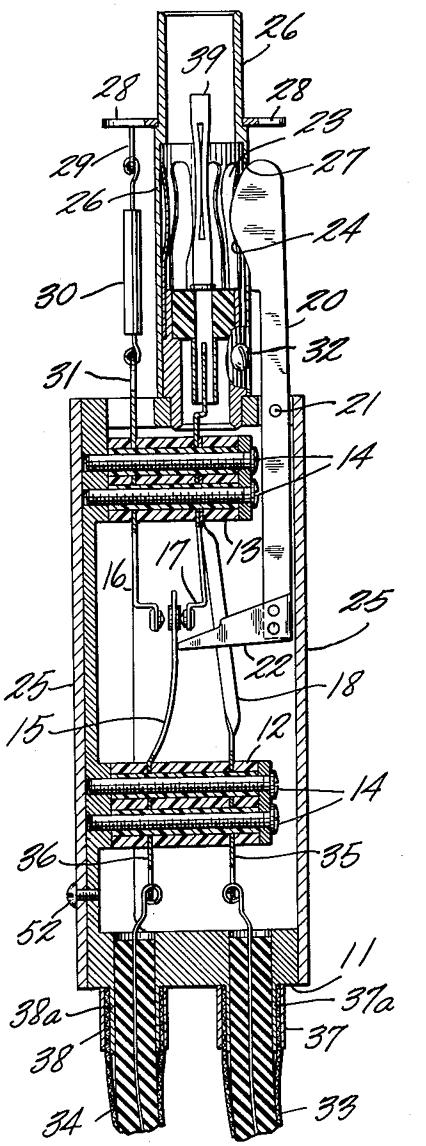
FIG. 1 is an illustration of a self-normalling video jack constructed in accordance with the invention.
Figure 3:
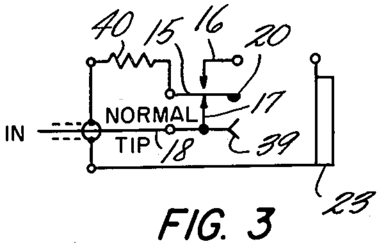
Figure 4:
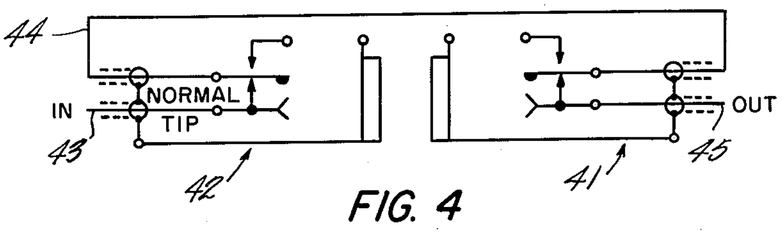
Figure 5:
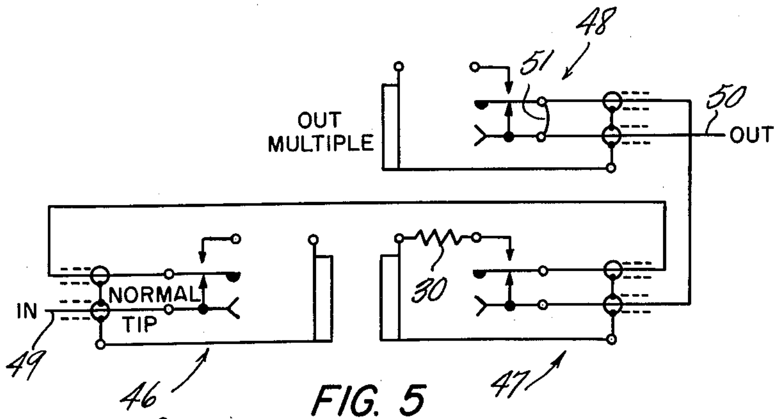
Figure 2A:
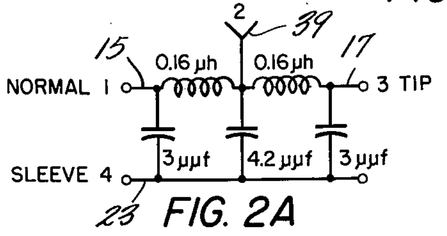

FIG. 2*a* represents the equivalent circuit for a typical jack of the type shown in FIGS. 1 and 2; and FIGS. 3–5, inclusive, are schematic diagrams of illustrative electrical connections that may be made using the video jack illustrated in FIGS. 1 and 2.

The self-normalling jack illustrated in FIGS. 1 and 2 includes a frame 11 which supports two columns of insulating material 12 and 13. The insulating columns 12 and 13 are divided into three sections which are fastened together and to the frame 11 by means such as screws 14 individually sleeved with insulating material as shown in FIG. 1, and support a normalling spring 15, a terminating spring 16, a tip spring 17 and a conductor 18. The springs 16 and 17 extend approximately one-half inch rearwardly of the insulating column 13 in parallel spaced apart relation as shown. In practice, they may be made of beryllium copper spring stock, say .020 inch thick and .190 inch wide, preferably gold plated to prevent contamination and each with a palladium contact at the end thereof.

The spring 15 is positioned remotely from the springs 16 and 17 and it extends forwardly from the insulating column 12. It too may be made of .020 inch thick beryllium copper spring stock .190 inch wide, gold-plated to prevent contamination, and it has a forwardly extending curved portion terminating in a palladium contact which normally engages the contact at the end of the spring 17, the clearance between the bottom of the contact on the end of the spring 16 and the top of the contact on the end of the spring 15 being about .025 inch.

Pivotally mounted on the frame 11 at 21 is a rocker arm 20 made of rigid material such as hardened tool steel, for example. The rocker arm 20 has an insulated switch actuator portion 22 made of nylon, for example, engaging the underside of the spring 15 and a cam surface 24 which extends between two adjacent leaf springs of the jack socket 23. It will be apparent that when the usual video plug is inserted in the socket 23, it will actuate the rocker arm 20 to move the contact on the spring 15 out of engagement with the contact on the spring 17 and into engagement with the contact on the spring 16.

The jack socket 23 is of the usual type and it is tightly fitted in an opening in the front end of the frame 11. It has a center pin connector 39 which is insulated from the socket 23 and is electrically connected to the front end of the spring 17, as shown in FIG. 1.

A casing 25 is adapted to slide over the top of the frame 11 and to be secured to the latter by suitable means such as screw 52 to protect the springs and contacts from the harmful effects of dust and moisture. A collar 26 fits over the top of the leaf springs comprising the jack socket 23 and is fastened thereto by means such as a screw 32. The collar has a slot 27 formed in one side through which the cam surface 24 of the rocker arm 20 protrudes. A flange 28 is fastened to the collar 26 by such means as spot-welding and has a lug 29 attached to one side. In certain applications of the jack, a terminating resistor 30 may be electrically connected between the lug 29 and a terminal end 31 of the spring 16 which extends through an opening formed in the front end of the frame 11. When the jack is completely assembled, as shown in FIG. 1, it may be fastened to a conventional jackfield panel by bolts (not shown) inserted through holes formed in the flange 28.

The rear ends 35 and 36 of the conductor 18 and the spring 15, respectively, may be electrically connected to the center conductors of a pair of coaxial cables 33 and 34. Thus, the insulated center conductors may be threaded through nipples 37*a* and 38*a* at the rear end of the frame 11 and soldered to the rear ends 35 and 36 of the spring 15 and the conductor 18. The outer conductive braids of the two coaxial cables are grounded to the frame 11 by sleeves 37 and 38 which are crimped in place over the nipples 37*a* and 38*a*, respectively.

A self-normalling jack of the type described above has been found to behave substantially like a low pass filter having lumped electrical constants as specified in FIG. 2*a*, the cutoff frequency being well above 30 megacycles per second. Measurements have indicated that in conventional 75 ohm coaxial video circuits, the impedance discontinuity introduced by a jack according to the invention is extremely low. In fact, the change in standing wave ratio produced when the jack is inserted in a long length of coaxial cable is negligible.

Moreover, crosstalk between contacts and associated contact springs is quite low at all video frequencies. For example, crosstalk isolation between the spring 17 and the spring 15 with the contacts open is about 57 db at 10 megacycles per second, and is even greater at lower frequencies.

A jack of the type shown in FIGS. 1 and 2 may be used in a jackfield in several different ways, three of which are shown in FIGS. 3–5, inclusive. FIG. 3 illustrates how the jack may be used to effect connection to an auxiliary unit which is connected into the system only when another component becomes inoperative or to produce special effects. This unit is normally terminated by a resistor 40 connected between the terminal 36 and the frame nipple 38*a* (FIG. 1). When the output from this unit is to be connected into the system, a patch plug is inserted into the sleeve 23 which causes the normalling spring 15 to break contact with the tip spring 17. The inner conductor of the patch plug then makes contact with the tip terminal 39. Hence, it is no longer necessary to remove a terminating plug in order to gain access to the tip terminal as would have been the case when using a conventional video jack.

FIG. 4 illustrates the usual connection wherein two jacks 41 and 42 are normalled. The output from a first component comes into the jackfield by way of a coaxial cable 43 and is connected to the jack 42. Jack 42 is connected to jack 41 by a short normalling coaxial cable 44 and jack 41 is connected to the input to a second component by a coaxial cable 45. If the program coming into the jackfield on the cable 43 is to be picked up, a patch plug is inserted into the jack 42 which picks up the program and breaks the connection between the jacks 41 and 42. Similarly, if it is desired to introduce a new program from an auxiliary unit at this point, a patch plug is inserted into the jack 41 which disconnects the jacks 41 and 42 and connects the output from the auxiliary unit to the cable 45. These operations, carried out using conventional jacks, would have required the withdrawal of normalling plugs from the jacks and then the insertion of patch plugs. Besides the extra operations required, this procedure using conventional jacks has the disadvantage that it introduces a discontinuity in the program being transmitted.

In the schematic diagram of FIG. 5, the jacks 46 and 47 are normalled and the jack 48 is a multiple of the jack 47. Normally the program comes into the jackfield from a first component by way of a cable 49 and goes out to the next component by way of a cable 50. The program may be picked up at this point by inserting a patch plug into the jack 46 in the manner previously described. If a program from an auxiliary unit is to be introduced at this point, a patch plug is inserted into the jack 47. A terminating resistor 30 is connected between the terminating spring and the lug 29 of jack 47, as shown in FIG. 1, so that the component connected to cable 49 is properly terminated. The multiple jack 48 is provided so that the program can be metered at this point without opening the circuit. A strap 51 across the tip and normalling springs of the jack 48 insures that the program will not be interrupted when a plug is inserted into the jack 48.

It is possible to insert a test probe in the jack described above without disturbing the contacts. This may be accomplished by using a jack plug having a central socket for connection to the pin 39 (FIG. 1) and an outer sleeve, the latter being shortened so that when the plug is inserted in the socket 23 proper connection is made to the pin 39 without the rocker arm 20 being depressed.

It can be seen, therefore, that the invention provides a novel and useful jack for use in a video jackfield. A jack of the type shown permits all normalling and terminating connections to be made automatically at the rear of the jackfield so that only patch plugs have to be introduced at the front. This feature greatly increases the convenience as well as the appearance of the jackfield. Another principal advantage of this type of jack is the fact that normalling plugs and terminating plugs do not have to be removed before a patch plug can be inserted which provides continuity of service. A still further advantage of this jack is the fact that it is compatible with existing plugs and jacks and in many cases may be installed in existing jackfields.

While a particular embodiment of the present invention has been shown and described for purposes of illustration, it is apparent that changes and modifications may be made without departing from this invention in its broader aspects. Therefore, the invention described herein is not to be construed as limited to the specific embodiment described but is intended to encompass all modifications thereof coming within the scope of the following claims.

I claim:

1. A jack comprising a frame having spaced apart front and rear ends joined by a side member, a plug receptacle secured to said front end and having a center conducting pin, a pair of parallel spaced apart contact arms extending rearwardly from said front end and terminating in spaced apart contacts, means mounting said contact arms in insulated spaced apart relation to said frame side member and to each other, means connecting one of said contact arms to said center pin, a third contact arm mounted in insulated spaced apart relation to said frame side member and remotely with respect to said first and second contact arms, said third contact arm having a contact normally engaging the contact on one of said first and second contact arms, a conductor mounted in parallel spaced apart relation to said third contact arm and electrically connected to said one of said first and second contact arms, means on said frame rear end providing access for electrical connection to said third contact arm and to said conductor, and a lever arm pivotally mounted on said frame front end having actuator means at one end for altering the engagement status of said contacts and cam means at its other end positioned to be actuated by a jack plug upon insertion into said receptacle.

2. A jack comprising a frame having spaced apart front and rear ends joined by a connecting member, a plug receptacle secured to said front end and having a center conducting pin, a contact arm electrically connected to said center pin, said contact arm extending rearwardly from said front end and terminating in a contact, means mounting said contact arm in insulated spaced apart relation to said connecting member, a second contact arm extending from said rear end towards said front end and terminating in a second contact adapted to be engaged with and disengaged from said first contact, means mounting said second contact arm in insulated spaced apart relation to said connecting member with said second contact in stacked relation to said first contact, means on said rear frame end providing access for electrical connection to said second contact arm, and means actuatable upon insertion of a plug in said receptacle for altering the engagement status of said contacts.

3. A jack comprising a frame having spaced apart front and rear ends joined by a connecting member, a plug receptacle secured to said front end and having a center conducting pin, first and second parallel spaced apart contact arms extending rearwardly from said front end and terminating respectively in stacked first and second spaced apart contacts, means mounting said contact arms in insulated spaced apart relation to said connecting member and to each other, means connecting one of said contact arms electrically to said center pin, a third contact arm extending from said rear end towards said front end and terminating in a third contact adapted to engage selectively said first and second contacts, means mounting said third contact arm in insulated spaced apart relation to said connecting member with said third contact in stacked relation to said first and second contacts, means on said frame rear end providing access for electrical connection to said third contact arm, and means actuatable upon insertion of a plug in said receptacle for altering the engagement status of said first, second and third contacts.

References Cited in the file of this patent

UNITED STATES PATENTS

| | | |
|---|---|---|
| 732,012 | Skirrow | June 23, 1903 |
| 860,070 | Yaxley | July 16, 1907 |
| 1,676,055 | Schellenger | July 3, 1928 |
| 2,020,402 | Edwards et al. | Nov. 12, 1935 |

FOREIGN PATENTS

| | | |
|---|---|---|
| 12,452 | Great Britain | July 26, 1910 |
| 399,244 | Italy | Oct. 21, 1942 |